Patented May 2, 1944

2,347,945

UNITED STATES PATENT OFFICE 2,347,945

TREATMENT OF HYDROCARBON MATERIALS

Frederick E. Frey, Bartlesville, Okla., assignor to Phillips Petroleum Company, a corporation of Delaware No Drawing. Application June 16, 1941, Serial No. 398,361

11 Claims. (Cl. 260—683.4)

This invention relates to the treatment of hydrocarbon materials, and more particularly to the removal of organically combined fluorine from hydrocarbon materials.

In the manufacture of hydrocarbons by processes in which fluorine-containing catalysts are used, small proportions of organic fluorine-containing by-products are formed. These processes may involve reactions such as polymerization and alkylation of relatively low-boiling hydrocarbons to produce higher boiling hydrocarbons in the presence of catalysts comprising one or more of such fluorine compounds as hydrofluoric acid, boron trifluoride, and the like. Polymerization yields a product that may be hydrogenated into saturated hydrocarbons in a subsequent hydrogenation step; alkylation advantageously yields a product containing predominantly or entirely saturated hydrocarbons. Although the exact nature or composition of fluorine-containing by-products which may also be present has not been definitely established, they are believed to be predominantly alkyl fluorides. They are not completely removed by washing the hydrocarbons with alkali solutions. They tend to decompose at elevated temperatures, such as those employed in fractional distillation of the hydrocarbons, thereby forming hydrofluoric acid, which is corrosive, especially in the presence of moisture.

It is an object of this invention to free hydrocarbon materials from undesirable organic fluorine compounds.

It is another object of this invention to produce normally liquid hydrocarbons suitable for motor fuel.

It is another object of this invention to remove organic fluorine compounds from a normally liquid or normally gaseous hydrocarbon material containing them.

Other objects and advantages will be apparent from the accompanying disclosure and discussion.

According to this invention, organic fluorine compounds are removed from hydrocarbon materials containing them by contacting such a hydrocarbon material with solid porous contact materials. Contact materials which have been found suitable include those known to be catalytically active for hydrogenation or dehydrogenation reactions, such as alumina gel, activated alumina, dehydrated bauxite, chromium oxide, mixtures of alumina and chromium oxide, metals of the iron group, especially finely divided nickel deposited on an inert support, and the like. Such contact materials appear to adsorb preferentially the organic fluorine compounds, although the exact mechanism involved is not fully known at present. The hydrocarbon material being treated may be in either the liquid or the vapor phase.

The temperatures preferred for contacting the hydrocarbon material with the contact material are dependent on the activity of the contact material being used in any particular instance, and in general conditions of temperature and contact time should be well below those which would induce deterioration or alteration of the hydrocarbon material. While the removal of organic fluorine compounds may be effected at ordinary temperatures in some instances, it is generally aided by elevated temperatures, especially when the contact material is partly spent. Temperatures between about 70 and 750° F. may be employed for removing organic fluorine compounds and most effective removal is accomplished at the higher temperatures. However, the temperature of treatment is dependent on the space velocity of the stock passed over the contact material and in order that substantially large quantities of stock may be treated in a relatively short period of time, in an economic manner, and without extensive side reactions, I prefer to effect removal of organic fluorine compounds at temperatures between about 150 and 550° F.

At temperatures in the high part of the effective range very high space velocities, such as, for example, 3000 volumes of vapor per volume of contact material per hour, are satisfactory, and are generally to be desired. If lower temperatures and longer contact times are desirable, satisfactory operation will generally be obtained at lower flow rates. In general the space velocity at which the contacting is effected depends not only upon the temperature but also upon the content of fluorine, the pressure used, the desired extent of fluorine removal, and the particular contact material in use. A suitable space velocity may be readily found by trial by one skilled in the art, for any particular application of my invention, in the light of the accompanying disclosure and discussion.

The pressures used in the practice of this invention may be low superatmospheric pressures, usually between zero and 500 pounds per square inch gage, although higher pressures may be used if desired, for example up to 1500 pounds per square inch. The use of relatively high pressures in connection with the treatment of this invention may be of particular advantage when said treatment is carried out prior to a hydrogenation step at substantially the same or even higher temperatures and pressures. Thus, effluent olefinic polymer from said treatment may be passed without cooling or lowering of the pressure directly to a hydrogenation unit for substantially complete conversion to paraffinic form. Such an arrangement allows most economical operation by utilizing the heat and pressure supplied to the material undergoing treatment for the hydrogenation operation. However, when operations following the treatment of this invention do not particularly require high superatmospheric pressures, I prefer to perform the treatment of this invention at low superatmospheric pressures, such as between 5 and 50 pounds per square inch gage.

*Example I*

A debutanizer overhead effluent, principally butane, containing 0.0225 per cent organically combined fluorine by weight and obtained from the alkylation of a $C_4$ hydrocarbon fraction with an olefin in the presence of hydrofluoric acid was passed as a vapor at about atmospheric pressure through 325 cc. of 14–20 mesh dehydrated bauxite in a 0.75-inch stainless-steel tube heated electrically. The resulting effluent was collected by condensation in an aluminum bomb and was later analyzed for its content of organic fluorine. The following data were obtained.

| Run | Temp. | Space velocity | Organic F in effluent | F removed |
|---|---|---|---|---|
| | °F. | Vol./vol./hr. | Per cent by weight | Per cent by weight |
| 620–147 | 82 | 120 | 0.0005 | 98 |
| | 150 | 120 | 0.0010 | 96 |
| | 150 | 240 | 0.0001 | 99.6 |
| | 200 | 240 | 0.0000 | 100 |
| | 200 | 120 | 0.0000 | 100 |
| 620–143 | 450 | 120 | 0.0000 | 100 |
| | 700 | 120 | 0.0000 | 100 |

Even at ordinary room temperature the removal of organic fluorine was almost complete; at elevated temperatures it was complete.

*Example II*

The process was carried out as in Example I except that the contact material was a hydrogenation catalyst consisting of nickel supported on kieselguhr. Complete removal of organic fluorine was effected at the temperature of 250, 450 and 700° F.; even at room temperature the removal would be complete.

*Example III*

Another portion of the debutanizer overhead effluent of Example I containing 0.0225 per cent organic fluorine was passed as a vapor at about atmospheric pressure through 15 cc. of 14–20 mesh dehydrated bauxite in a 10-mm. glass tube heated electrically. The resulting effluent was collected and analyzed. The following data were obtained:

| Sample | Temp. | Space velocity | Organic F in effluent | F removed | Cumulative vapor volumes treated |
|---|---|---|---|---|---|
| | °F. | Vol./vol./hr. | Per cent by weight | Per cent by weight | |
| 1 | 200 | 600 | 0.0000 | 100 | 1,600 |
| 2 | 200 | 240 | 0.0000 | 100 | 8,840 |
| 3 | 200 | 1,500 | 0.0000 | 100 | 11,080 |
| 4 | 200 | 600 | 0.0000 | 100 | 13,080 |
| 5 | 200 | 1,200 | 0.0000 | 100 | 29,000 |
| 6 | 200 | 2,580 | 0.0000 | 100 | 31,000 |
| 7 | 150 | 1,200 | 0.0000 | 100 | 36,000 |
| 8 | 150 | 600 | 0.0002 | 99 | 38,000 |
| 9 | 82 | 600 | 0.0005 | 98 | 47,000 |
| 10 | 82 | 1,200 | 0.0006 | 97 | 49,000 |
| 11 | 200 | 1,200 | 0.0009 | 96 | 49,000 |
| 12 | 200 | 1,200 | 0.0008 | 96 | 73,000 |
| 13 | 150 | 1,200 | 0.0002 | 99 | 96,000 |
| 14 | 150 | 3,000 | 0.0003 | 99 | 97,000 |
| 15 | 98 | 3,000 | 0.0019 | 92 | 100,000 |
| 16 | 150 | 1,800 | 0.0011 | 95 | 140,000 |
| 17 | 200 | 1,800 | 0.0005 | 98 | 148,000 |
| 18 | 200 | 1,800 | 0.0002 | 99 | 179,000 |
| 19 | 200 | 1,200 | 0.0000 | 100 | 180,000 |
| 20 | 200 | 1,200 | (1) | | 208,000 |

[1] Sample lost

In the course of this run, which extended continuously for nine days, the 15-cc. portion of bauxite removed a total of 1.6 grams of organic fluorine. At the end of the run, the bauxite was still capable of effecting complete removal of fluorine at a space velocity of 1200 volumes of vapor per volume per hour, at a temperature of about 200° F. The resultant effluent was acid-free, as far as could be determined by an acid-sensitive indicator, but it is not known definitely whether any of the organic fluorine was converted to hydrofluoric acid.

*Example IV*

A motor fuel, which was prepared by the alkylation of isobutane with isobutylene in the presence of 97 per cent hydrofluoric acid, was passed at various flow rates through 10 cc. of 14–20 mesh bauxite at various temperatures in a 9-mm. glass tube, under enough pressure to keep it in the liquid state. The original motor fuel contained 0.0745 per cent organic fluorine. The treated motor fuel was analyzed for its fluorine content. The following data were obtained:

| Sample | Temp. | Flow | F found | F removed | Cumulative liquid volumes treated |
|---|---|---|---|---|---|
| | °F. | Cc./hr. | Percent by wt. | Percent by wt. | |
| 1 | 78 | 18 | 0.0011 | 98 | 6 |
| 2 | 78 | 390 | 0.0553 | 26 | 15 |
| 3 | 78 | 80 | 0.0258 | 65 | 24 |
| 4 | 152 | 45 | 0.0020 | 97 | 33 |
| 5 | 148 | 19 | 0.0028 | 96 | 43 |
| 6 | 159 | 360 | 0.0328 | 56 | 59 |
| 7 | 200 | 360 | 0.0023 | 97 | 72 |
| 8 | 203 | 24 | 0.0002 | 99.7 | 81 |

The foregoing examples illustrate the excellent results obtained by the practice of the invention as applied to hydrocarbon materials in both vapor and liquid phases. Although the examples refer to once-through operation, it is entirely within the scope of this invention to recirculate at least a portion of the effluent from a treating zone back to said zone. When once-through operation does not effect a desirable removal of organic fluorine compounds, effluent from a first zone may be subjected to additional treatment in a second zone under similar conditions.

Because the invention may be practiced otherwise than as specifically described or illustrated, and because many modifications and variations within the spirit and scope of it will be obvious to those skilled in the art, the invention should not be unduly restricted by the foregoing specification and examples, but it should be restricted only in accordance with the appended claims.

Having thus described my invention, I claim:

1. A process for treating hydrocarbon materials to remove organically combined fluorine therefrom, which comprises subjecting a hydrocarbon material containing a minor quantity of organically combined fluorine to the action of a solid, porous metal oxide catalytically active for hydrogenation and dehydrogenation reactions, at a reaction temperature and for a time such that extensive chemical changes in said hydrocarbon material itself are not effected and such that the total effluent from said treatment is essentially fluorine-free.

2. The process of claim 1 in which said metal oxide is alumina in the form of dehydrated bauxite.

3. The process of claim 1 in which said metal oxide is alumina gel.

4. The process of treating a paraffinic hydrocarbon mixture containing a normally liquid paraffinic hydrocarbon material and a minor quantity of an organic fluorine compound, which comprises subjecting said mixture to the action of a solid, porous metal oxide catalytically active for hydrogenation and dehydrogenation reactions, under conditions suitable for removing an organic fluorine compound from the mixture and such that the total effluent from said contact material is essentially fluorine-free, and removing from the treating zone a substantially pure normally liquid hydrocarbon material.

5. A process for removing organic fluorine compounds from a paraffinic hydrocarbon mixture containing a minor quantity of such fluorine compounds, which comprises passing the mixture in contact with dehydrated bauxite under conditions adapted to remove substantially all of the organic fluorine compounds and to produce a total effluent essentially fluorine-free and separating from the mixture a substantially pure hydrocarbon material.

6. A process for producing paraffin hydrocarbons boiling in the motor fuel range, which comprises alkylating a low-boiling alkylatable paraffin hydrocarbon with an olefin in the presence of a hydrofluoric acid alkylation catalyst to produce normally liquid paraffin hydrocarbons boiling in the motor fuel range, recovering from effluents of said alkylation a liquid paraffinic hydrocarbon fraction containing such normally liquid paraffins so produced together with minor amounts of dissolved organic fluorine compounds produced in and incidental to said alkylation, passing said hydrocarbon fraction through a mass of granular dehydrated bauxite at a temperature between about 70 and 550° F. and under a super-atmospheric pressure sufficient to maintain said fraction in liquid phase at a flow rate such that the effluent of said bauxite mass is essentially free of fluorine, and recovering from effluents of said bauxite mass an essentially fluorine-free paraffinic hydrocarbon fraction boiling in the motor fuel range.

7. In a process for converting hydrocarbons into other hydrocarbons in which a hydrocarbon material to be converted is subjected to conversion in the presence of an inorganic fluorine-containing catalyst and in which conversion minor amounts of organic fluorine compounds are incidentally produced, the improvement which comprises recovering from effluents of said conversion a hydrocarbon fraction containing hydrocarbons resulting from said conversion together with minor amounts of organic fluorine compounds produced in and incidental to said conversion, passing said hydrocarbon fraction in the absence of added reactants through a mass of a solid, porous metal oxide catalytically active for hydrogenation and dehydrogenation reactions, at a temperature between about 70 and 550° F. at a flow rate such that the effluent of said mass of contact material is essentially free of fluorine, and recovering from effluents of said contact material an essentially fluorine-free hydrocarbon material so produced.

8. A process for treating hydrocarbon materials to remove organically combined fluorine therefrom, which comprises subjecting a hydrocarbon material containing a minor quantity of organically combined fluorine to the action of a solid, porous alumina, at a reaction temperature and for a time such that extensive chemical changes in said hydrocarbon material itself are not effected and such that the total effluent from said treatment is essentially fluorine-free.

9. A process for treating hydrocarbon materials to remove organically combined fluorine therefrom, which comprises subjecting a hydrocarbon material containing a minor quantity of organically combined fluorine to the action of a solid, porous chromium oxide, at a reaction temperature and for a time such that extensive chemical changes in said hydrocarbon material itself are not effected and such that the total effluent from said treatment is essentially fluorine-free.

10. A process for removing organic fluorine compounds from a paraffinic hydrocarbon mixture containing a minor quantity of such fluorine compounds, which comprises passing the mixture in contact with a solid, porous chromium oxide under conditions adapted to remove substantially all of the organic fluorine compounds and to produce a total effluent essentially fluorine-free, and separating from the mixture a substantially pure hydrocarbon material.

11. A process for treating hydrocarbon materials to remove organically combined fluorine therefrom, which comprises subjecting a hydrocarbon material containing a minor quantity of organically combined fluorine to the action of a solid, porous metal oxide catalytically active for hydrogenation and dehydrogenation reactions, at a reaction temperature between about 70 and 550° F. and for a time such that extensive chemical changes in said hydrocarbon material itself are not effected and such that the total effluent from said treatment is essentially fluorine-free.

FREDERICK E. FREY.